(12) United States Patent
Benoit et al.

(10) Patent No.: US 7,180,666 B2
(45) Date of Patent: Feb. 20, 2007

(54) POLARIZED LIGHT ILLUMINATION DEVICE

(75) Inventors: Pascal Benoit, Rennes (FR); Valter Drazic, Betton (FR); Khaled Sarayeddine, Nouvoitou (FR)

(73) Assignee: Thomson Licensing, Boulogne-Billancourt (FR)

( * ) Notice: Subject to any disclaimer, the term of this patent is extended or adjusted under 35 U.S.C. 154(b) by 180 days.

(21) Appl. No.: 10/519,631

(22) PCT Filed: Jun. 19, 2003

(86) PCT No.: PCT/EP03/50244

§ 371 (c)(1),
(2), (4) Date: Dec. 28, 2004

(87) PCT Pub. No.: WO2004/003631

PCT Pub. Date: Jan. 8, 2004

(65) Prior Publication Data

US 2005/0248928 A1    Nov. 10, 2005

(51) Int. Cl.
    *G02B 5/30* (2006.01)
    *G02B 27/28* (2006.01)
(52) U.S. Cl. .......... 359/496; 359/487; 362/19
(58) Field of Classification Search ........ 359/487, 359/494, 496, 834; 362/19
See application file for complete search history.

(56) References Cited

U.S. PATENT DOCUMENTS

| | | | | |
|---|---|---|---|---|
| 2,000,379 A * | 5/1935 | Deisch | ........... | 348/768 |
| 2,666,355 A * | 1/1954 | Trurnit | ........... | 356/36 |
| 2,976,764 A * | 3/1961 | Hyde et al. | ........... | 356/367 |
| 3,432,223 A * | 3/1969 | Uchida | ........... | 359/247 |
| 3,635,563 A * | 1/1972 | Mouchart | ........... | 356/364 |
| 3,741,660 A | 6/1973 | Abu-Shumays et al. | | |
| 4,514,047 A * | 4/1985 | Haskal et al. | ........... | 359/487 |
| 4,786,802 A | 11/1988 | Yoshii et al. | | |
| 5,684,630 A * | 11/1997 | Arai | ........... | 359/487 |
| 6,690,513 B2 * | 2/2004 | Hulse et al. | ........... | 359/485 |

FOREIGN PATENT DOCUMENTS

| | | |
|---|---|---|
| DE | 19638645 | 3/1998 |
| EP | 0431894 | 6/1991 |
| JP | 57-169935 | * 10/1982 |
| SU | 1130778 | 12/1984 |

OTHER PUBLICATIONS

Patent Abstracts of Japan, vol. 008, No. 151, Jul. 13, 1984 & JP 59-048716.

(Continued)

*Primary Examiner*—Ricky D. Shafer
(74) *Attorney, Agent, or Firm*—Joseph J. Laks; Harvey D. Fried; Patricia Verlangieri

(57) ABSTRACT

The invention concerns a polarized light illumination device comprising in particular: a light source, an optical Fresnel Rhomb polarization device receiving light from the source and reflecting it at least twice on at least two opposite surfaces, a reflective polarizer arranged opposite the output surface of the Fresnel Rhomb polarization device to receive the reflected light so as to allow through linearly polarized light along a first direction and to reflect light having any other type of polarization, a reflecting device arranged between the polarization device and the light source so as to allow through the light but to reflect the light reflected by the reflective polarizer. The invention is applicable to liquid crystal display for illuminating liquid crystal valves.

16 Claims, 2 Drawing Sheets

OTHER PUBLICATIONS

Figure 1:
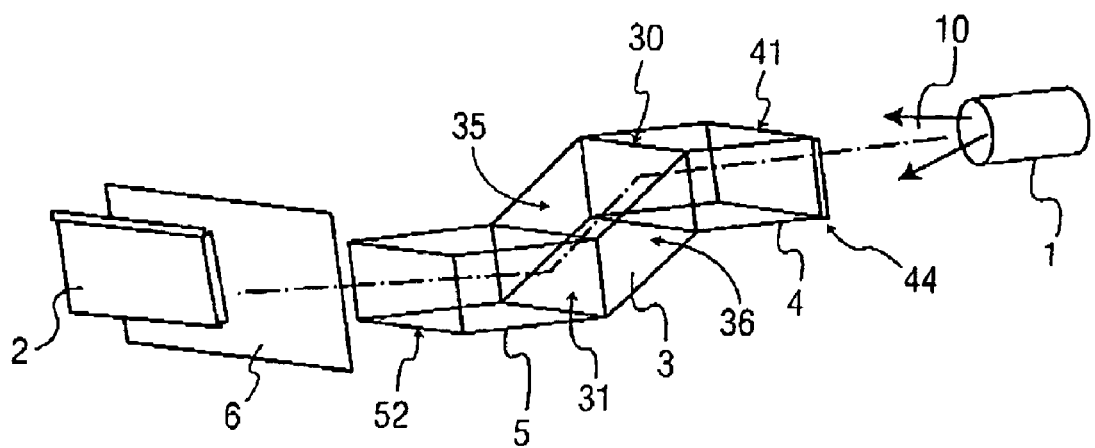

A.V. Balakin et al.: "Experimental observation of the interference of three-and five-wave mixing processes into the signal of second harmonic generation in bacteriorhodopsin solution" Optics Communications, North-Holland Publishing Co. Amsterdam, NL, vol. 141, No. 5-6, Sep. 15, 1997, pp. 343-352.

* cited by examiner

POLARIZED LIGHT ILLUMINATION DEVICE

The invention relates to a polarized light illumination device. It is applicable for example to the illumination of spatial light modulators requiring polarized light to be effective.

Some devices, in fact, operate with light linearly polarized in a single direction. Such is the case, for example, with liquid crystal displays which use liquid crystal modulators to allow information and/or pictures to be viewed.

In such systems, a number of solutions are possible. A polarized light source (laser) can be used, but it must offer good polarization stability and provide sufficient candle power.

An unpolarized light source can also be used, but in this case the two polarizations of the light must be separated. The light polarized in a first direction is used directly or almost directly. To avoid losing the energy carried by the polarized light in a second direction perpendicular to the first direction and so avoid using only half of the power of the light source, this light is subjected to processing used to rotate its polarization by 90° so that it becomes polarized in the first direction.

For this, a device called a $\lambda/4$ plate is positioned on the path of the light to be processed, with the effect of rotating the polarization of the light by 90°. It is known in the technology that this $\lambda/4$ plate can take the form of a film of polymer material but such a film presents the drawback of deteriorating when exposed to heat and in the case of a liquid crystal display, for example, considerable power is required to view a screen. The $\lambda/4$ plate can also take the form of a quartz plate. However, such a device presents the drawback of not being achromatic and in the case of color systems this is a serious drawback.

The object of the invention is therefore to produce a lighting device with characteristics that are stable in temperature and which induces no or virtually no chromatic distortions.

The invention therefore relates to a polarized light optical illumination device which comprises:
- a light source emitting a first light beam,
- a Fresnel-Rhomb type optical polarization device receiving, via an input face, the first light beam which is reflected at least twice by at least two opposite faces of said optical polarization device and supplying, via an output face, at least a second beam,
- a reflective polarizer positioned facing the output face of the Fresnel-Rhomb polarization device to receive the second light beam so as to allow the linearly polarized light to pass in a first direction and to reflect light presenting any other polarization,
- a reflection device positioned between the input face of the polarization device and the light source so as to allow said first light beam to pass but to reflect the light returned by the reflective polarizer.

According to an exemplary embodiment of the invention, this illumination device also comprises:
- a first optical guide having an input face designed to receive said first light beam, an output face pressed against the input face of the Fresnel-Rhomb polarization device with its optical axis perpendicular to said input face, the cross section of this first guide being roughly of the same dimensions as the surface of the input face,
- and a second optical guide having an input face pressed against the output face of the Fresnel-Rhomb polarization device and an output face emitting towards the reflective polarizer light received from the source, the optical axis of the second optical guide being perpendicular to the output face of the Fresnel-Rhomb polarization device, and the cross section of this second guide being roughly of the same dimensions as the surface of the input face.

According to an embodiment of the invention, either or both of the guides operate as light integrators.

The output face of the Fresnel-Rhomb optical polarization device can be made to have a shape similar to that of a surface intended to be illuminated by said illumination device. Since the Fresnel-Rhomb polarization device has a rectangular or square cross section, said optical guides preferably have rectangular or square cross sections.

The following arrangements can also be used, separately or combined:
- the reflective polarizer is positioned facing the output face of the second guide;
- the reflective polarizer is oriented at 45° relative to said opposite faces of said optical polarization device;
- the reflection device is located on the input face of the Fresnel-Rhomb polarization device or on the input face of the first optical guide;
- said two or more said opposite faces of the Fresnel-Rhomb optical polarization device induce on a light beam a total phase shift of 90° between the S and P polarization components when this beam is passed through the Fresnel-Rhomb optical polarization device;
- the reflection device includes a layer of a reflective material including a non-reflecting area to allow the passage of said first light beam;
- the light source includes a reflector lit by a light source and focusing the light in the Fresnel-Rhomb polarization device;
- the axis of the first light beam coincides with the optical axis of the first optical guide;
- said first light beam is not collimated;
- said first light beam is convergent.

Finally, the invention is applicable to a display system in which a display device is positioned facing the reflective polarizer so as to be lit by the light transmitted by this reflective polarizer. This display device can be a liquid crystal modulator.

Figure 2A:
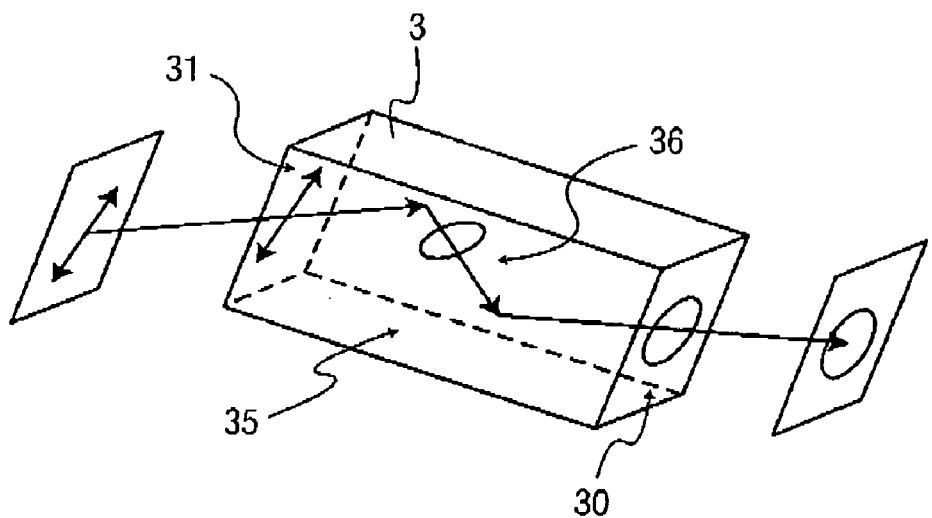
Figure 2B:
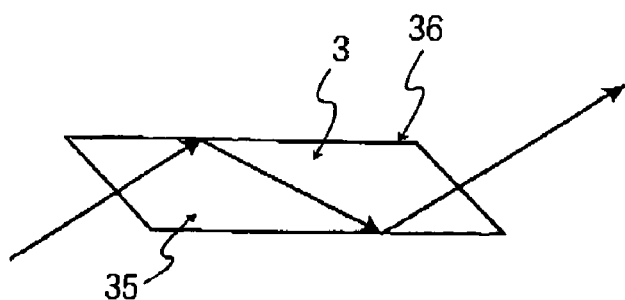
Figure 3:
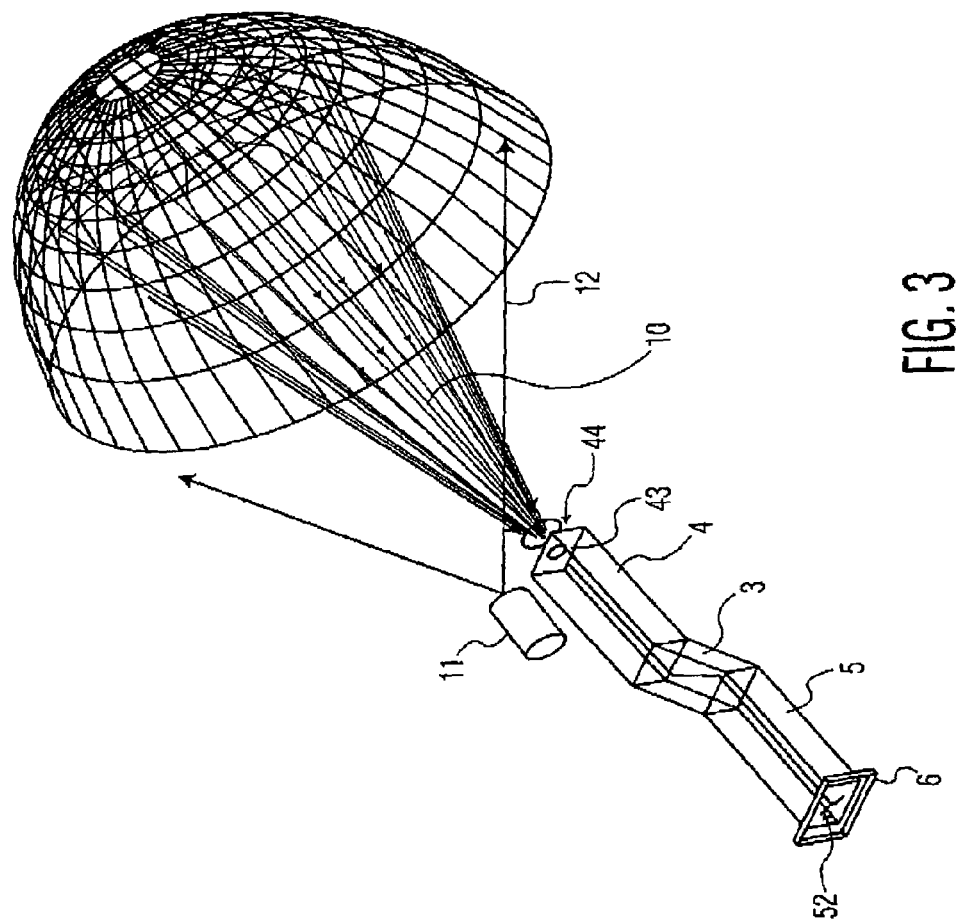

The various objects and features of the invention will become more clearly apparent from the description that follows, given by way of non-limiting example, and from the appended figures which represent:

FIG. 1, a general exemplary embodiment of an illumination device according to the invention, FIGS. 2a and 2b, a Fresnel-Rhomb polarization device, FIG. 3, a more detailed example of an exemplary embodiment of this device.

With reference to FIG. 1, a general exemplary embodiment of a device according to the invention will therefore be described first of all.

This device comprises:
- a light source 1 emitting a beam 10 of unpolarized light;
- a light integrating/polarizing device 3/4/5;
- a reflective polarizer 6 appropriately oriented to allow the linearly polarized light to pass in a polarization direction;
- a reflection device 44 located between the light source 1 and the integrating/polarizing device, this reflection device allowing the beam 10 to pass into the integrat ing/polarizing device but reflecting the light coming from the reverse direction as is described below;

an object 2 intended to be lit by polarized light.

The role of the integrating/polarizing device 3/4/5 is, on the one hand, to obtain a uniform rectangular lighting from a non-rectangular source and, on the other hand, to polarize the light as will be described in the description that follows. This integrating/polarizing device 3/4/5 includes, in its central part, mainly a Fresnel-Rhomb polarization device 3 known in the art. A description of such a device can be found in the publication OPTICS—$2^{nd}$ edition—by Eugène HECHT—Addison-Wesley Publishing Company, Inc.—1987.

This device has at least two faces providing at least two reflections of an input beam. For example, as is shown in FIGS. 2a and 2b, it can be designed in the form of a parallelepiped, the lateral faces 35 and 36 of which are flat. The input face 30 of the device 3 makes an angle with the lateral faces such that a light beam entering into the guide via the input face 30 at a near normal angle of incidence, is subject to a first reflection on a lateral face 35, then a second reflection on a lateral face 36 opposite to the first, to be directed to the output face 31. Preferably, the output face is roughly at right angles to the direction of the output light ray and is therefore parallel to the input face 30. The inclination of the device in relation to the direction of incidence of the input light beam is calculated according to the refractive index of the material of the device 5 to have the two above reflections inside the device and to obtain the operation described below.

The operation of such a Fresnel-Rhomb device is based on a double reflection of the light incoming via the face 30, in which the phase shift of each total reflection between the P and S polarizations is around 45° for an average ray roughly perpendicular to the input face 30. Thus, on passage into the device 3, the total phase shift between P and S will be 90°. The result is that, depending on the polarization of the incident light beam, the action of the device 3 may be as follows:

for a polarization of the linear input light at +45° (amplitude of P and S equal and phase shift between P and S zero), the output polarization will be right circular;

for a linear polarization at −45° (amplitude of P and S equal and phase shift between P and S of 180°), the output polarization will be left circular;

for a right circular polarization (amplitude of P and S equal and phase shift between P and S of 90°), the output polarization will be linear at −45°;

for a left circular polarization (amplitude of P and S equal and phase shift between P and S of −90°), the output polarization will be linear at 45°;

for a horizontal linear polarization, the final polarization will be unchanged;

for a vertical linear polarization, the final polarization will be unchanged;

for any linear polarization (zero phase shift), the output polarization will be elliptical but not circular.

Therefore, in the case of an unpolarized incident beam (beam supplied by the lamp 1), the light passing for the first time into the device 3 leaves mainly unpolarized via the face 31. The reflective polarizer 6 is appropriately oriented to allow the polarized light to pass in a polarization direction. For example, the orientation of the reflective polarizer 6 will preferably be at 45° relative to the reflection faces 35, 36 of the device 3. The light not transmitted is reflected by the reflective polarizer 6 which returns linearly polarized light in a direction at 45°. In these conditions, the reflective polarizer must be oriented so that the direction of the polarization of the reflected light makes an angle of approximately 45° with the mean plane of incidence on the face 36.

As can be seen in FIG. 2a, a linearly polarized beam has its polarization converted to elliptical polarization on the first reflection (on face 36), then to circular polarization on the second reflection (on face 35). This beam is then reflected towards the interior of the device 3 by the reflection device 44 with a reversed circular polarization. In the device 3, the light reflected by the device 44 is again reflected in the reverse direction by the face 35 with an elliptical polarization, then by the face 36 with a linear polarization which is now perpendicular to the polarization of the light which had previously been reflected by the reflective polarizer 6. This light then passes through the reflective polarizer 6.

FIG. 1 shows that the polarization device 3 is located between two guides 4 and 5 respectively attached to the input face 30 and the output face 31 of the device 3. According to the exemplary embodiment in FIG. 1, the input face 41 of the guide 4 and the output face 52 of the guide 5 are roughly perpendicular, respectively in the input and output directions of the axis of the light beam to be processed. The optical guides 4 and 5 have the particular feature of operating in integrator mode and they are, preferably, parallelepipedal in shape. As shown in FIG. 1, their cross sections can be roughly of the same dimensions as the input and output faces 30 and 31 respectively of the device 3.

Without this being mandatory, the length of the device 3 is calculated so that, for an average ray of the beam 10 entering into the device via the center of the face 30, the output area of this average ray is preferably located roughly in the middle of the output face 31.

Furthermore, in the case where the device 2 in FIG. 1, which must be illuminated by the light beam being processed, is a spatial light modulator of rectangular shape, the cross section of the guide 5 will advantageously be made roughly the shape of the spatial light modulator in a more or less homothetic ratio.

Furthermore, to make the reflection device 44, the input face 41 of the guide 4 or the input face 30 of the device 3 can be made to reflect the light returned by the reflective polarizer 6. A non-reflecting area 43 is provided for the passage of the incident beam 10. In the example in FIG. 1, the face 41 of the guide 4 is made to be reflecting.

FIG. 3 represents a more detailed exemplary embodiment of the device according to the invention. This device includes a mirror 12 lit by a light source 11 and used to inject the light into the guide 4. This mirror can be parabolic and the source 11 is located at the focal point of the mirror. The face 41 is treated to be reflective or is provided with a surface 44 to reflect the light reflected by the reflective polarizer 6 and includes an untreated area 43 to allow the passage of the light beam supplied by the source 11 and the mirror 12.

According to a preferred exemplary embodiment of the invention, the beam 10 injected into the guide 4 is not collimated and, in particular, it can be convergent so that it can be injected into the device 3 via the untreated area 43. The axis of the beam 10 can be oriented according to the optical axis of the input guide 4, but this is not mandatory.

The illumination device according to the invention is thus used to supply a linearly polarized light in a single direction without having to worry about the problems of heating and chromaticity described at the start of the description. Furthermore, the use of the guides 4 and 5 integrating the light with a non-collimated incident beam 10 provides a uniform output lighting and adapts the shape of the incident beam to the surface to be lit. In particular, the cross section of the output guide can have a shape adapted to the surface to be lit.

In the above description, and in the appended figures, the faces 35 and 36, on which the reflections take place inside the device 3, are assumed to be parallel. However, according to a variant embodiment, they can be made non-parallel but their respective orientations must be such that the phase shifts induced successively by the reflections on the two faces 35 and 36 are 90° in total (when the light passes through). Furthermore, in the above description, it was provided that on a passage, through the device 3, the light was reflected twice (on the two opposite faces 35 and 36) but, without departing from the spirit of the invention, a larger number of reflections could be provided, the objective being that on a passage, a phase shift of 90° is imparted on the S and P polarizations of the light. In these conditions, the device 3 could be other than parallelepipedal:

the faces 35 and 36 might not be parallel, the device 3 might include a larger number of faces for reflecting the light inside the device.

Moreover, the reflective polarizer 6 can be pressed against the output face 52 of the guide 5 to provide a compact device.

According to a variant embodiment, the object to be lit 2 can also be pressed against the reflective polarizer 6. In the case of a single-valve display system where the object 2 is a spatial light modulator such as a liquid crystal screen lit by transmission, the dimensions of the output face 51 of the guide 5 can be matched to the dimensions of the part of the liquid crystal screen to be lit to provide a compact system.

The invention claimed is:

1. A polarized light optical illumination device comprising a light source emitting a first light beam wherein it comprises: a Fresnel-Rhomb type optical polarization device receiving, via an input face, the first light beam which is reflected at least twice by at least two opposite faces of said optical polarization device and supplying, via an output face, at least a second beam; a reflective polarizer positioned facing the output face of the Fresnel-Rhomb polarization device to receive the second light beam so as to allow the linearly polarized light to pass in a first direction and to reflect light presenting any other polarization; a reflection device positioned between the input face of the polarization device and the light source so as to allow said first light beam to pass but to reflect the light returned by the reflective polarizer.

2. The optical illumination device as claimed in claim 1, wherein it comprises:

a first optical guide having an input face designed to receive said first light beam, an output face pressed against the input face of the Fresnel-Rhomb polarization device with its optical axis perpendicular to said input face, the cross section of this first guide being roughly of the same dimensions as the surface of said input face of the Fresnel-Rhomb polarization device, and a second optical guide having an input face pressed against the output face of the Fresnel-Rhomb polarization device and an output face emitting towards the reflective polarizer light received from the source, the optical axis of the second optical guide being perpendicular to the output face of the Fresnel-Rhomb polarization device, and the cross section of this second guide being roughly of the same dimensions as the surface of said output face of the Fresnel-Rhomb polarization device.

3. The optical illumination device as claimed in claim 2, wherein either or both of the optical guides operate as light integrators.

4. The optical illumination device as claimed in claim 2, wherein since the Fresnel-Rhomb polarization device has a rectangular or square cross section, said optical guides have rectangular or square cross sections.

5. The optical illumination device as claimed in claim 2, wherein the reflective polarizer is positioned facing the output face of the second guide.

6. The optical illumination device as claimed in claim 2, wherein the axis of the first light beam coincides with the optical axis of the first optical guide.

7. The optical illumination device as claimed in claim 1, wherein the output face of the Fresnel-Rhomb optical polarization device has a shape similar to that of a surface intended to be illuminated by said illumination device.

8. The optical illumination device as claimed in claim 1, wherein the reflective polarizer is oriented approximately at 45° relative to said opposite faces of said optical polarization device.

9. The optical illumination device as claimed in claim 1, wherein the reflection device is located on the input face of the Fresnel-Rhomb polarization device or on the input face of the first optical guide.

10. The optical illumination device as claimed in claim 9, wherein the reflection device includes a layer of a reflective material including a non-reflecting area to allow the passage of said first light beam.

11. The optical illumination device as claimed in claim 1, wherein said two or more opposite faces of the optical polarization device induce on a light beam a total phase shift of 90° between the S and P polarization components of said beam.

12. The optical illumination device as claimed in claim 11, wherein both said opposite faces of the optical polarization device are parallel.

13. The optical illumination device as claimed in claim 1, wherein the light source includes a reflector lit by a light source and focusing the light in the Fresnel-Rhomb polarization device.

14. The optical illumination device as claimed in claim 13, wherein said first light beam is convergent.

15. The optical illumination device as claimed in claim 1, wherein said first light beam is not collimated.

16. The optical illumination device as claimed in claim 1, wherein it includes a display device located facing the reflective polarizer so as to be lit by the light transmitted by this reflective polarizer.

* * * * *